March 28, 1967  S. A. HOLBUS  3,311,377
GOLF SWING PRACTICING DEVICE
Filed March 11, 1964  2 Sheets-Sheet 1
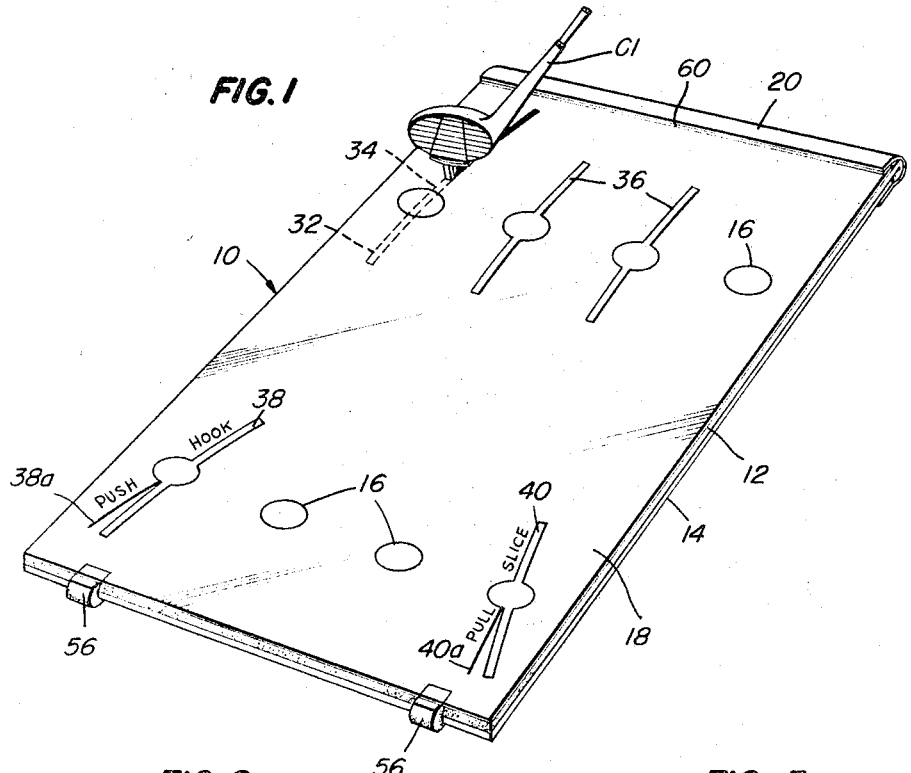
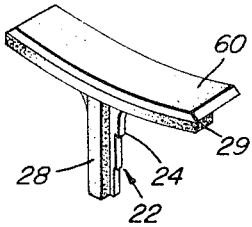
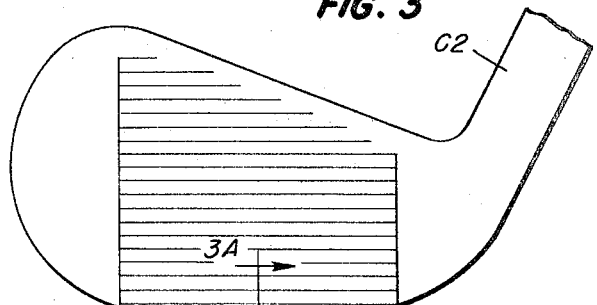
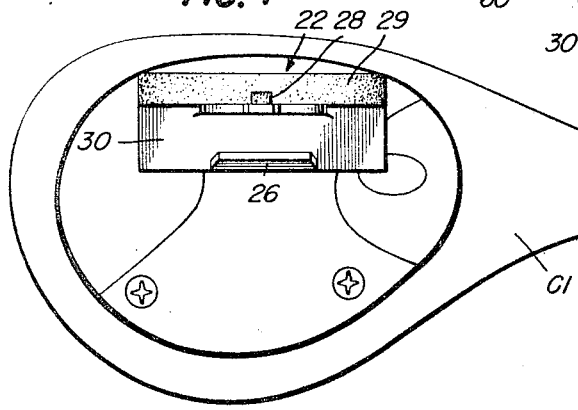
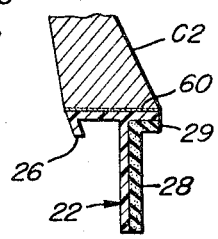
INVENTOR.
Steven Holbus
BY Walter G. Finch
ATTORNEY

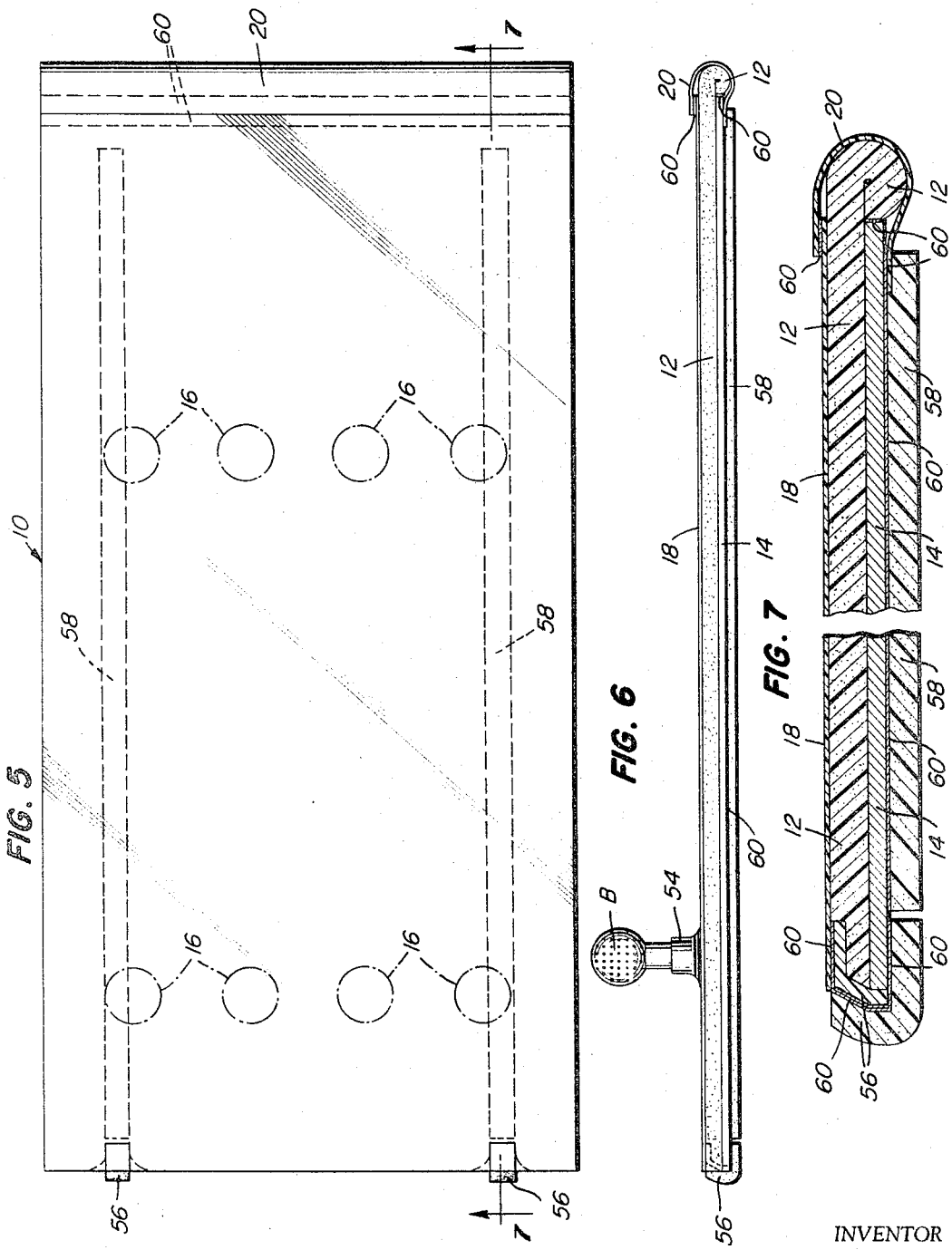

United States Patent Office 3,311,377
Patented Mar. 28, 1967

3,311,377
GOLF SWING PRACTICING DEVICE
Steven A. Holbus, 252 E. 33rd St., Erie, Pa. 16504
Filed Mar. 11, 1964, Ser. No. 350,975
3 Claims. (Cl. 273—186)

This invention relates generally to educational devices, and more particularly it pertains to a teaching aid for analysis of the stroking habit of a golfer, by the golfer himself, or by the golfer with the assistance of a teaching golf professional.

Many attempts have been made to provide devices which guide a golfer in perfecting his swing. In general, these have been lacking in some manner. Apparatus is described in the art which marks the bottom of a golf club. This fails to indicate strokes accurately because of the shortness of the marked area. One cannot distinguish an arc from a straight line nor correctly determine the direction of the impact of the ball from such devices.

Where a marker on the club has been provided, means are lacking for accurately holding its position throughout the swing and during its writing cycle. Suggested devices also are on the obvious, heavy, and cumbersome side and affect the balance of the club.

It is an object of the present invention, therefore, to provide a golf club swing recording device that permits the use of a perfectly natural golf swing and which is not apparent to the user.

Another object of the invention is to provide a swing tracing type of training aid for golfers which records with continuous trace, the approach, impact and carry through motions of a club swing of a golfer.

Another object of this invention is to provide a marker that can be used on any forcibly swung golf club.

To provide a teaching aid for golfers which can be used to record stroke efficacy against a golf ball, is yet another object of this invention.

To provide a combination golf swing marking area and fiducial chart which is protected, reusable, and readily changed is still another object of this invention.

Other objects and attendant advantages of this invention will become more readily apparent and understood from the following detailed specification and accompanying drawings in which:

FIG. 1 is a perspective view of a golf teaching aid device embodying the fiducial features and indicia of this invention showing it in use without a ball;

FIG. 2 is a perspective view, approximately full size, of a teaching aid marker for use with the teaching aid device of FIG. 1;

FIG. 3 is a side elevation of an iron golf club head equipped with the teaching aid marker of FIG. 2;

FIG. 3A is a cross section taken along line 3A—3A of FIG. 3;

FIG. 4 is a bottom view of a wood golf club head equipped with the teaching aid marker of FIG. 2;

FIG. 5 is a plan view of the golf teaching aid of FIG. 1 clarifying features of assembly;

FIG. 6 is a side elevation of the teaching aid device of FIG. 5 showing a golf ball on a special tee required; and FIG. 7 is a vertical section, considerably enlarged, taken on line 7—7 of FIG. 6.

In FIG. 1, reference numeral 10 indicates generally the stationary embodiment of the golf teaching aid device incorporating features of this invention. This teaching aid device 10 consists of a mat 12 preferably of grass-green poly-urethane foam, or other shock absorbing or cushioning material, adhered to a shorter hardboard or stiff sheet 14.

A protective transparent sheet 18 of polyester film, known as "Mylar" or equivalent material overlies the green upper planar area of mat 12. Upon the underside of the sheet 18, there is provided silk-screened in white paint, one or more circles 16, representing golf balls, and fiducial marks 36, 38, 40, 38a, and 40a representing the correct swing path and various incorrect swing paths of a golf club head such as hook, slice, push or pull.

A short sheet 20 of clear, pliant, polyvinyl is formed around one end of the teaching aid device 10. It is preferably secured to the sheet 18 and to the underside of the hardboard 14, with adhesive coated polyester film 60 so as to secure the sheet 18 in a fixed position at this end in relationship to the mat 12.

To prevent the overlying protective sheet 18 from moving out of position at the opposite end and to make it lie flat, a pair of clips 56 assembled from two pieces each of adhesive backed poly-urethane foam are attached to the sheet 18, over the edges of 12 and to the hardboard 14 as shown best in FIG. 7. To prevent the unit 10 from sliding on indoor floor surfaces or outdoor grass or ground surfaces, two or more poly-urethane foam strips 58 are attached to the underside of the device 10, as shown best in FIGS. 5, 6, and 7.

For use with the teaching aid device 10, a marker 22, shown in FIG. 2 is molded preferably from polyethylene plastic. This marker 22 is provided for adhesive application to the usual golf clubs C1 and C2 shown best in FIGS. 3, 3A and 4.

As shown in FIGS. 2, 3, 3A, and 4, this marker 22 consists in the general form of a thin flexible inverted pedestal or web with step-tapering sides. The steps are to indicate points for cutting the holder 24 to shorter lengths to suit the individual preference of golfers. A back-up projection or support 26 rises from the rear of marker 22 and is intended to afford support to the holder 24 as it flexes considerably backward in use.

A soft marking strip 28 of felt or similar absorptive material is adhered vertically to the front of the holder 24. The marking strip 28 is doped with a washable marking ink or with washable crayon so as to be capable of writing upon the sheet 18.

Wings of a flexible strip 30 extend laterally from the base of the holder 24. By adhesive means 60 on this strip 30, the marker 22 can be securely attached as shown to the sole of the wood club C1, or the iron club C2, with the marking strip 28 toward the ball-addressing side.

In use, the operator swings the club C1, or C2, thus prepared, at the simulated ball circle 16 and the path 32 of the swing is recorded as a mark 34 traced by the marking strip 28 upon the sheet 18. The degree of correctness or incorrectness of the traced mark 34 is readily apparent by comparison with the above mentioned delineated fiducial marks 36, 38, 40, 38a and 40a.

Adjustment, and degree of adjustment by the operator of his grip, stance, or pivot is visually indicated after each practice swing. Use of a wiping cloth will remove the traced mark 34 after each or any number of practice swings. However, should abrasions or damage occur to the sheet 18 after extended use, it is easily replaced by freeing the adhered end of the pliant sheet 20 from the sheet 18 and freeing the sheet 18 from the adhering clips 56 at the opposite end.

For outdoor use with an actual golf ball B, a suction cup tee 54 with step tapered sides, which result from varying diameters, and molded preferably from neoprene rubber is applied to the transparent sheet 18 as shown best in FIG. 6. The previously mentioned circles 16 then become the locating points for setting the tees 54.

Obviously many modifications and variations of the present invention are possible in the light of the above teachings. It is therefore to be understood that, within the scope of the appended claims, the invention may be practiced otherwise than as specifically described.

What is claimed is:

1. A reusable golf swing recording device for use in analysis of the stroking habit of a golfer, comprising, a rigid base, a cushioning or shock absorbing mat of greater length and pre-determined color positioned to extend beyond said base at one end, a protective transparent sheet positioned adjacent to the upper planar area of said mat and co-extensive therewith, spaced indicia and fiducial marking of a different predetermined color simulating golf balls and golf club swing paths respectively, positioned on the underside of said transparent sheet, transparent and pliant means for holding said transparent sheet firmly but movably in place at one end of said recording device, clip means for holding said sheet firmly but movably in place at the opposite end of said device, spaced members having friction engaging under surfaces secured to the underside of said rigid base to keep said recording device from sliding, a golf club, and means including a flexible holder in the shape of an inverted pedestal with step tapering sides and wings secured to the sole of said golf club and extending downwardly therefrom and having a portion also extending downwardly from said golf club opposite the above mentioned extending pedestal to provide a support for said flexible pedestal and a marking member having a marking substance associated therewith secured to the front face of said holder, whereby when a golfer swings said golf club at one of said simulated golf balls on the underside of said transparent sheet and contrasted against upper planar area of said mat, a recording is made of the path described by said club head over said recording device by said marking substance being frictionally transferred from the above mentioned marking member to the upper side of the transparent sheet as the said holder is forced backwardly against the said support by pressure of a golf club moved through a golf swing, with the frictionally transferred marking substance being easily removable from said upper side of said transparent sheet due to the relationship between the composition of both the marking member and said transparent sheet.

2. A reusable golf swing recording device for use in analysis of the stroking habit of a golfer, comprising, a rigid base, a cushioning, shock absorbing mat of greater length and pre-determined color positioned adjacent to said base and arranged to extend beyond said base at one end, a protective transparent sheet positioned adjacent to the upper planar area of said mat and co-extensive therewith, said sheet having means allowing a mark made by a marker thereon to be easily removable, spaced indicia and fiducial marking of a different predetermined color simulating golf balls and golf club swing paths respectively, positioned on the underside of said transparent sheet, transparent and pliant means for holding said transparent sheet firmly but movably in place at one end of said recording device, clip means for holding said sheet firmly but movably in place at the opposite end of said device, and spaced members having friction engaging under surfaces secured to the underside of said rigid base to keep said recording device from sliding.

3. A marker device for use with a golf club, comprising, a flexible holder or plastic-resin in the shape of an inverted pedestal with step tapering sides and wings for positioning along the sole of said golf club and extending downwardly therefrom and having a portion also extending downwardly from said golf club opposite the above mentioned extending pedestal to provide a support for said flexible pedestal, adhesive means for securing the upper surface of said pedestal and said wings to said sole of said golf club, and marking means having a marking substance associated therewith secured to the front face of said holder, whereby when a golfer swings said golf club at a simulated golf ball on the underside of a transparent sheet and contrasted against upper planar area of a mat, a recording is made of the path described by said club head over said transparent sheet by said marking substance being frictionally transferred from the above mentioned marking means to the upper side of the transparent sheet as the said holder is forced backwardly against the said support by pressure of said golf club moved through a golf swing.

References Cited by the Examiner

UNITED STATES PATENTS

| 1,383,876 | 7/1921 | Sullivan | 273—195 X |
| 1,651,264 | 11/1927 | Fish | 273—186 |
| 2,995,376 | 8/1961 | Leo | 273—186 |

FOREIGN PATENTS

| 241,018 | 2/1960 | Australia. |
| 758,109 | 9/1956 | Great Britain. |

RICHARD C. PINKHAM, *Primary Examiner.*

L. J. BOVASSO, *Assistant Examiner.*